United States Patent
Hutchinson

(10) Patent No.: US 12,508,772 B2
(45) Date of Patent: Dec. 30, 2025

(54) SELF-MODIFYING AGITATION PROCESS AND APPARATUS FOR SUPPORT REMOVAL IN ADDITIVE MANUFACTURING AND 3D PRINTED MATERIAL

(71) Applicant: PostProcess Technologies, Inc., Buffalo, NY (US)

(72) Inventor: Daniel Joshua Hutchinson, Orchard Park, NY (US)

(73) Assignee: PostProcess Technologies, Inc., Buffalo, NY (US)

( * ) Notice: Subject to any disclaimer, the term of this patent is extended or adjusted under 35 U.S.C. 154(b) by 254 days.

(21) Appl. No.: 18/195,787

(22) Filed: May 10, 2023

(65) Prior Publication Data
US 2023/0278289 A1 Sep. 7, 2023

Related U.S. Application Data

(62) Division of application No. 16/340,647, filed as application No. PCT/US2017/055957 on Oct. 10, 2017, now Pat. No. 11,701,829.
(Continued)

(51) Int. Cl.
*B29C 64/35* (2017.01)
*B08B 3/12* (2006.01)
(Continued)

(52) U.S. Cl.
CPC ............... *B29C 64/35* (2017.08); *B08B 3/12* (2013.01); *B24B 49/003* (2013.01); *B24B 49/14* (2013.01);
(Continued)

(58) Field of Classification Search
CPC ......... B29C 64/35; B29C 64/386; B08B 3/12; B24B 49/003; B24B 49/14; B33Y 40/00; B33Y 50/00
See application file for complete search history.

(56) References Cited

U.S. PATENT DOCUMENTS

2005/0103360 A1   5/2005   Tafoya
2008/0041700 A1   2/2008   Potterfield et al.
(Continued)

FOREIGN PATENT DOCUMENTS

JP   2002205339 A   7/2002
JP   2010131675 A   6/2010
(Continued)

OTHER PUBLICATIONS

International Preliminary Report on Patentability from International Patent Application No. PCT/US2017/055957, dated Apr. 16, 2019, 5 pages.
(Continued)

*Primary Examiner* — Michael M. Robinson
(74) *Attorney, Agent, or Firm* — Lempia Summerfield Katz LLC

(57) ABSTRACT

A process for support material removal for 3D printed parts wherein the part is placed in a media filled tank and support removal is optimized in a multi-parameter system through an artificial intelligence process which may include, but is not limited to, the use of historical data, parametric testing data, normal support removal data, and outputs from other support removal AI models to generate optimally efficient use of each parameter in terms of pulse repetition interval (PRI) and cycle time as defined by pulse width (PW). The input parameters may include heat, circulation, ultrasound and chemical reaction, which are used in sequence and/or in parallel, to optimize efficiency of support removal. Sequentially and/or in parallel, heat, pump circulation and ultrasound may vary in application or intensity. Selection of means of agitation depends on monitored feedback from the support removal tank and application of a statistically dynamic rule based system (SDRBS).

19 Claims, 8 Drawing Sheets

Related U.S. Application Data

(60) Provisional application No. 62/406,187, filed on Oct. 10, 2016.

(51) Int. Cl.
| | |
|---|---|
| *B24B 31/10* | (2006.01) |
| *B24B 49/00* | (2012.01) |
| *B24B 49/14* | (2006.01) |
| *B29C 64/30* | (2017.01) |
| *B29C 64/386* | (2017.01) |
| *B33Y 30/00* | (2015.01) |
| *B33Y 40/20* | (2020.01) |
| *B33Y 50/00* | (2015.01) |

(52) U.S. Cl.
CPC ............ *B29C 64/30* (2017.08); *B29C 64/386* (2017.08); *B33Y 30/00* (2014.12); *B33Y 40/20* (2020.01); *B33Y 50/00* (2014.12); *B24B 31/10* (2013.01)

(56) References Cited

U.S. PATENT DOCUMENTS

| | | |
|---|---|---|
| 2011/0186081 A1 | 8/2011 | Dunn et al. |
| 2013/0052291 A1 | 2/2013 | Morikawa |
| 2013/0075957 A1 | 3/2013 | Swanson et al. |
| 2013/0248491 A1 | 9/2013 | Swanson et al. |
| 2017/0128987 A1 | 5/2017 | Dufort et al. |
| 2017/0239893 A1* | 8/2017 | Hoover ................ B29C 64/393 |
| 2019/0270248 A1 | 9/2019 | Hutchinson |

FOREIGN PATENT DOCUMENTS

| | | | |
|---|---|---|---|
| JP | 2011020412 A | 2/2011 | |
| WO | WO-2015196149 A1 * | 12/2015 | ............ B22F 10/00 |
| WO | 2018102731 A1 | 6/2018 | |

OTHER PUBLICATIONS

International Search Report and Written Opinion of the International Searching Authority from International Patent Application No. PCT/US2017/055957, dated Jan. 12, 2018, 6 pages.

* cited by examiner

SELF-MODIFYING AGITATION PROCESS AND APPARATUS FOR SUPPORT REMOVAL IN ADDITIVE MANUFACTURING AND 3D PRINTED MATERIAL

RELATED APPLICATIONS

The present application is a divisional under 37 C.F.R. § 1.53(b) of U.S. patent application Ser. No. 16/340,647 filed Apr. 9, 2019, now U.S. Pat. No. 11,701,829, which is a § 371 nationalization of PCT Application Serial No. PCT/US2017/055957, filed Oct. 10, 2017, designating the United States, and this patent document also claims the benefit of U.S. Provisional Patent Application No. 62/406,187, filed Oct. 10, 2016, the entire disclosures of which are incorporated by reference herein.

FIELD OF THE INVENTION

This invention relates generally to a method and apparatus for removing support material from unfinished manufactured parts, and, more specifically, to a method and apparatus for optimizing the support material removal process for unfinished manufactured parts Which are made using additive manufacturing techniques such as 3D printing.

BACKGROUND OF THE INVENTION

An unfinished manufactured part may include portions that are necessary for manufacture or are a necessary byproduct of the manufacturing process, but which are ultimately unwanted in the finished form of the part. Such portions are referred to herein as "support material" or merely as "support." In a conventional support removal machine, an unfinished 3D printed part may be subjected to a process to remove unwanted support material, and thereby provide a finished part. In one such process, the part is placed in a liquid filled tank, where mechanical agitation, abrasion and/or heating of the part occur in order to remove the support material. Mechanical agitation may occur by moving the liquid (e.g. via a pump) and/or by using ultrasound. In other such processes, the part is subjected to pressure from a liquid spray and/or treated with chemical solvents to dissolve support material, and thereby leave the finished form of the part. In some removal processes, the part is placed in a chamber, and a pump is used to circulate fluid through the chamber in order to mechanically agitate the part, while heat from a heat source increases the fluid temperature. Under these conditions the support material may be removed thermally, chemically, mechanically or via a combination of two or more of these general methods.

Traditional methods of support removal fail to optimize the support removal rates so as to maximize operation relative to a particular manufactured part. The methods used to control support removal are complex and may interrelate, even when applied sequentially. In addition, there are often trade-offs between achieving a fast support removal and potential damage to the part. Support removal has generally been limited to the use of one or two removal methods at a time, or used in systems where each removal method may have separate control systems that may be independently evaluated and adjusted on a periodic basis under controlled settings. The interrelationship between removal methods, such as agitation, temperature, chemical and fluid flow, are largely ignored despite the fact that one type of removal method may facilitate or hinder another removal method.

Furthermore, unfinished manufactured parts come in many sizes, shapes, and materials. Some removal methods are better suited than others, depending on the particular size, shape, and material.

Existing machines and processes for support removal are prone to causing damage to the part due to over-use of a particular removal method such as heat, chemical treatment, or abrasion. For example, excessive heat can cause weakening of delicate portions of a part, which may ultimately result in damage to the put. And, the use of ultrasonic agitation may result in heating of the part without a corresponding temperature increase of the media in which the part resides. The result may be an unexpected and unwanted increase in the part temperature, which results in damage to delicate portions of the part. In short, adverse impacts may arise from numerous methods interacting with one another, thereby resulting in suboptimal application of such methods for a particular part.

Suboptimal application of any one method may lead to inefficient use of energy and/or time. For example, excessive use of ultrasonic agitation may result in excessive heat generation and may require downtime while the system is cooled to a more optimal temperature, which takes time, and thus causes a less efficient process. Inefficiencies can manifest themselves in the form of taking too long to fully remove support material from the part, and/or removing too much material from the part, and/or ruining the surface finish of the part. Such losses in efficiency increase costs of operation.

Another example of an inefficiency is the suboptimal application of agitation, which can damage the part or lead to a ruined surface finish of the part. If the intensity of the agitation is too high, or if agitation is carried out too long, the support material may be fully removed, but the surface of the part may be eroded to an undesirable extent. The resulting parts may be unacceptable, resulting in a need to discard the part and to try again.

Compounding the problems arising from the use of conventional machines for support removal is an inability to precisely control removal methods. Often, conventional machines provide the user with an ability to merely engage or not engage a particular method, such as temperature, chemical pH, or agitation, which effectively amounts to providing an "on/off switch." For example, when removing support material using agitation, a circulating pump may be typically set at 100% power or 0% power. By limiting a user's choice to only 100% or 0%, the result may be in an inability to optimize the process, and an increase in the potential for damage to the part.

Multiple support removal methods operating simultaneously in a given machine could result in greater efficiency. However, traditional methods for managing multiple types of support removal methods are currently limited to (a) random application of methods, (b) manual application of methods, and (c) time-based sequencing of varying methods. In most cases, the methods are activated based on predetermined criteria, established protocols, sequential methods, time-based approaches, operator judgment, or combinations thereof, and result in indiscriminate removal of support material, and fail to properly take into account the degree to which support material should be removed from an unfinished part. For example, a finishing shop that uses only time-based methods will find that such methods are highly inefficient due to the wide variety of parts and materials that may be used in a particular machine. For example, a time-based method could easily dissolve a whole part if the run time was not set properly, or some other fixed parameter was too aggressive for the particular part.

Operators of support removal machines face the difficult task of controlling process parameters that have nonlinear relationships, some of which are discussed above, while maintaining capabilities to remove support material in a timely manner. On top of those challenges is the fact that different parts may react differently to the same process conditions. Simultaneously optimizing heat rate, ultrasonic agitation, pH, part rotation rate, or other aspects is at best challenging, and may be unrealistic for an operator to do manually. In addition, industry demands may impose further restrictions that impose significant restrictions on operating conditions for support removal machines and their operators.

To increase efficiency, support removal machines can be subject to rules formulated from operator experiences, design data, general scientific principles, and periodic testing. However, such rules alone likely cannot accommodate the diverse set of operating conditions that may be encountered by operators on a daily basis. Furthermore, time-based or random varying parameter-based systems alone may not be the best options due to the complexity of the individual parts and methods of agitation.

Thus, there has been a long-felt need for a method and apparatus for automatically removing support material from parts, either made from traditional or additive manufacturing techniques, and optimizing the support material removal process as the process progresses over defined time intervals by varying certain parameters of the process.

BRIEF SUMMARY OF THE INVENTION

The present invention may be embodied as a method for removing unwanted material from an unfinished manufactured part. Such a method may include features for optimizing the operation of a support removal machine that has a plurality of removal methods. In one such method an operation model may be generated and used to control operation of the support removal machine. The model may be provided with a plurality of input parameters associated with operation of the support removal machine, and using those input parameters, the model may generate one or more output parameters. Each output parameter may be associated with a goal for the support removal machine. The method may be carried out so as to identify one or more consecutive time increments, and during each time increment make one or more decisions that seek to achieve one or more of the desired goals. At least one of the decisions is associated with at least one discrete variable of operation corresponding to the support removal machine and based on the model. The support removal machine may be operated according to the decisions.

For example, in one such method that is in keeping with the invention, a 3D printed part having support material may be placed in a tank with a liquid detergent. Initial parameters within the tank, including, but not limited to temperature and pH, may be characterized and used to determine the amount and type of energy that should be applied to the part in order to remove the support material, initial parameters for the support removal machine may be based on operator experiences, static design data, general thermal principles and/or periodic testing. For example, a solid or dense object may require a greater initial heating time than a hollow object. Initial settings may be predicted based on previous experience with similar objects and thermal principles known to the operator, where the operator may be a person or a computer program.

In some embodiments of the invention, initial process parameters, such as a temperature around an initial predicted temperature setting, may be selected by a user and the effects within the tank may be measured over a time interval to determine an optimal value for a complete process.

Once a part having a support removal structure is placed in the tank, a pump may be used to causes media (such as a liquid) to flow through the tank. The media flow may cause one or more parts in the media to rotate and/or maintain a general position within the tank, and after a period of time, measurements of the part may be taken. Such measurements may include the amount of support material removed, or the amount of support material remaining to be removed. Sensors mounted in or near the tank may be used to obtain such measurements. In response to those measurements, the removal process parameters may be altered and/or adjusted to achieve a desired outcome. After making a plurality of such measurements, the particular series of operating parameters carried out by the support removal machine may become optimized for a particular part, and such a system may enable better predictions achieving more efficient removal of support removal in the future, not only for that particular part, but also for other parts like it. In doing so, initial predictions of operating parameters may be made more accurately, and subsequent alterations to the method and/or adjustments to the parameters may be smaller.

Depending on the characteristics of a particular part, a preferred method of agitation, such as chemical or thermal degradation of support material, may be used. However, when application of a preferred method becomes suboptimal, an alternative method of agitation may be activated during a down period for a preferred method. The alternative method of agitation is determined after a defined time interval if such alternative method would increase the efficiency of the process. Following the down period for a preferred method, the support removal system of the present invention may return to the preferred method until an upper limit of a design parameter, such as temperature, is reached again, whereupon the preferred method is de-activated again for a down period. If a design parameter exceeds an upper limit, then the process will become suboptimal. The support removal machine has sensors that may include temperature and/or pH sensors to receive feedback and alternatively deactivate different methods of agitation.

To limit damage to the part, each method of agitation is monitored to maximize support removal while leaving the part without support material intact. With particular regard to plastic 3D printed parts, it is critical to monitor each means of agitation to limit temperature increase of the part because plastic materials may be deformed when temperature becomes too high. Unlike with existing support removal systems, in the present invention a variety of agitation means are employed in sequence or in parallel depending on the feedback to an agitation algorithm (AGA). The process of the present invention utilizes heat, pumping, ultrasound and chemical means to enhance support removal. Agitation with ultrasound results in cavitation of detergents in the immediate vicinity of the support material while chemical reactions and pumping may work synergistically to promote support material removal.

Additionally, the present invention broadly includes a method of removing support material from a part, including placing a part with support material within a chamber, the chamber having a media arranged within, setting a set of first parameters of the media for a first time interval, measuring a first effect the media having the first parameters imparted on the support material over the first time interval prior to the end of the first time interval via a first sensor operatively arranged to view the part within the chamber, analyzing the measurements from the first sensor, determining a set of second parameters of the media for a second time interval, adjusting the media to the second parameters for the second time interval, repeating the method over a plurality of consecutive time intervals until a run time for the method has been reached, and removing the part from said chamber after the run time for the method has been reached.

Moreover, the present disclosure broadly describes an apparatus for support material removal, including a chamber operatively arranged to receive a part having support material, a media placed within the chamber, the media encompassing the part, a temperature control unit arranged to vary a temperature of the media within the chamber, an agitator arranged to agitate the media within the chamber, a pump operatively arranged to circulate the media within the chamber, a first sensor operatively arranged to detect a first set of parameters of the media, and a control unit communicatively connected to the first sensor, wherein during operation of the apparatus, the first sensor transmits the first set of parameters to the control unit, the control unit analyzes the first set of parameters to determine a second set of parameters of the media, the control unit outputting the second set of parameters to the temperature control unit, the pump, and the agitator.

Even further, the present disclosure broadly describes a method of removing support material from a part, including determining a first set of parameters of a media arranged within a chamber, subjecting a part with support material to the media having the first set of parameters over a first time interval, determining a second set of parameters of the media prior to the end of the first time interval, subjecting the part with support material to the media having the second set of parameters over a second time interval, the second time interval being shorter than the first time interval, repeating the method over a plurality of consecutive time intervals until a run time for the method has been reached, and removing the part from the media after the run time for the method has been reached.

A primary object of the present invention is to provide a support removal optimization system, method, and apparatus that utilizes calculations based on historical and real-time operating data acquired from support removal control systems.

Additionally, another object of the present invention is to provide a support removal optimization system and method that optimally determines when and which support removal agitation component to select and signal for activation.

Moreover, another object of the present invention is to provide a method for optimizing the operation of a support removal machine wherein one or more decisions are determined for at least one consecutive time increment, where at least one of the decisions is associated with a discrete variable for operation of a support removal agitation component.

These and other objects, features and advantages of the present invention will become readily apparent upon a review of the following detailed description, in view of the drawings and appended claims.

BRIEF DESCRIPTION OF THE DRAWINGS

The nature and mode of operation of the present invention will now be more fully described in the following detailed description of the invention taken with the accompanying figures, in which.

DETAILED DESCRIPTION

At the outset, it should be appreciated that like drawing numbers on different drawing views identify identical, or functionally similar, structural elements of the invention. It is to be understood that this invention is not limited to the disclosed aspects.

Furthermore, it is understood that this invention is not limited to the particular methodology, materials, or modifications described and, as such, the invention may vary from that which is disclosed herein. It is also understood that the terminology used herein is for the purpose of describing particular aspects.

Unless defined otherwise, all technical and scientific terms used herein have the same meaning as commonly understood to one of ordinary skill in the art to which this invention pertains. It should be understood that any methods, devices or materials similar or equivalent to those described herein can be used in the practice or testing of the method and apparatus.

Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Furthermore, as used herein, "optimization" is intended to mean an act, process, or methodology of making something (such as a design, system, or decision) as fully perfect, functional, or effective as possible. For example, an optimal process will achieve the best results possible from the process under the parameter ranges the process is allowed to operate in Additionally, as used herein, "determining" is intended to mean the act of receiving information from a sensor and executing an algorithm using that information to produce an output, for example via a computer that is programmed according to that algorithm.

Figure 1:
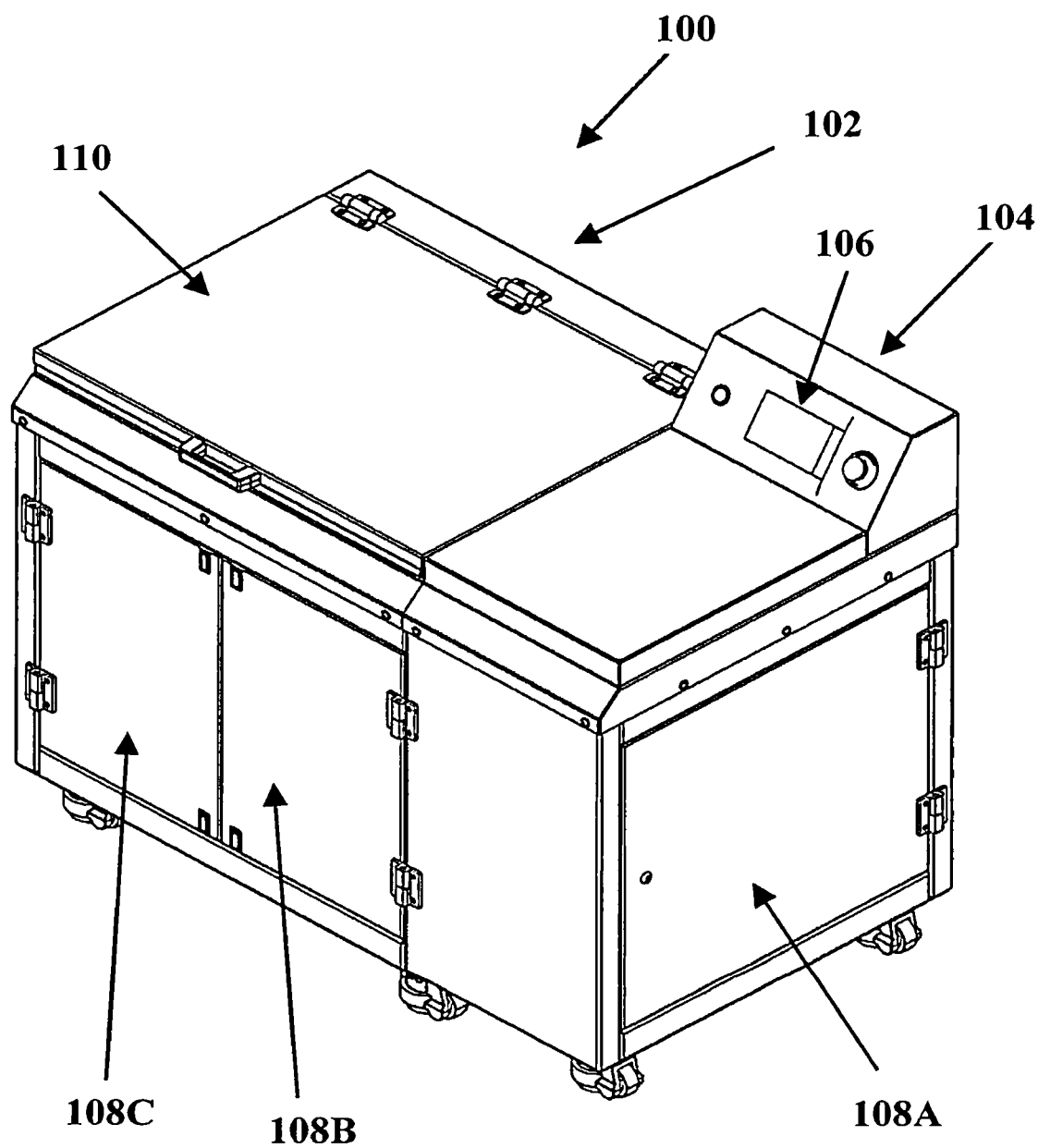
FIG. 1 is a perspective view of a support material removal apparatus.

Adverting now to the figures, FIG. 1 is a perspective view of support material removal apparatus 100. Support material removal apparatus 100 broadly includes chamber section 102, control unit section 104, control input screen 106, access doors 108A, 108B, and 108C, and lid 110. Within chamber section 102 is chamber 120 (shown in FIG. 3A). Within control unit section 104 is control unit 140. Control input screen 106 may be positioned so that a user can input certain operation parameters to be carried out by apparatus 100.

Figure 3A:
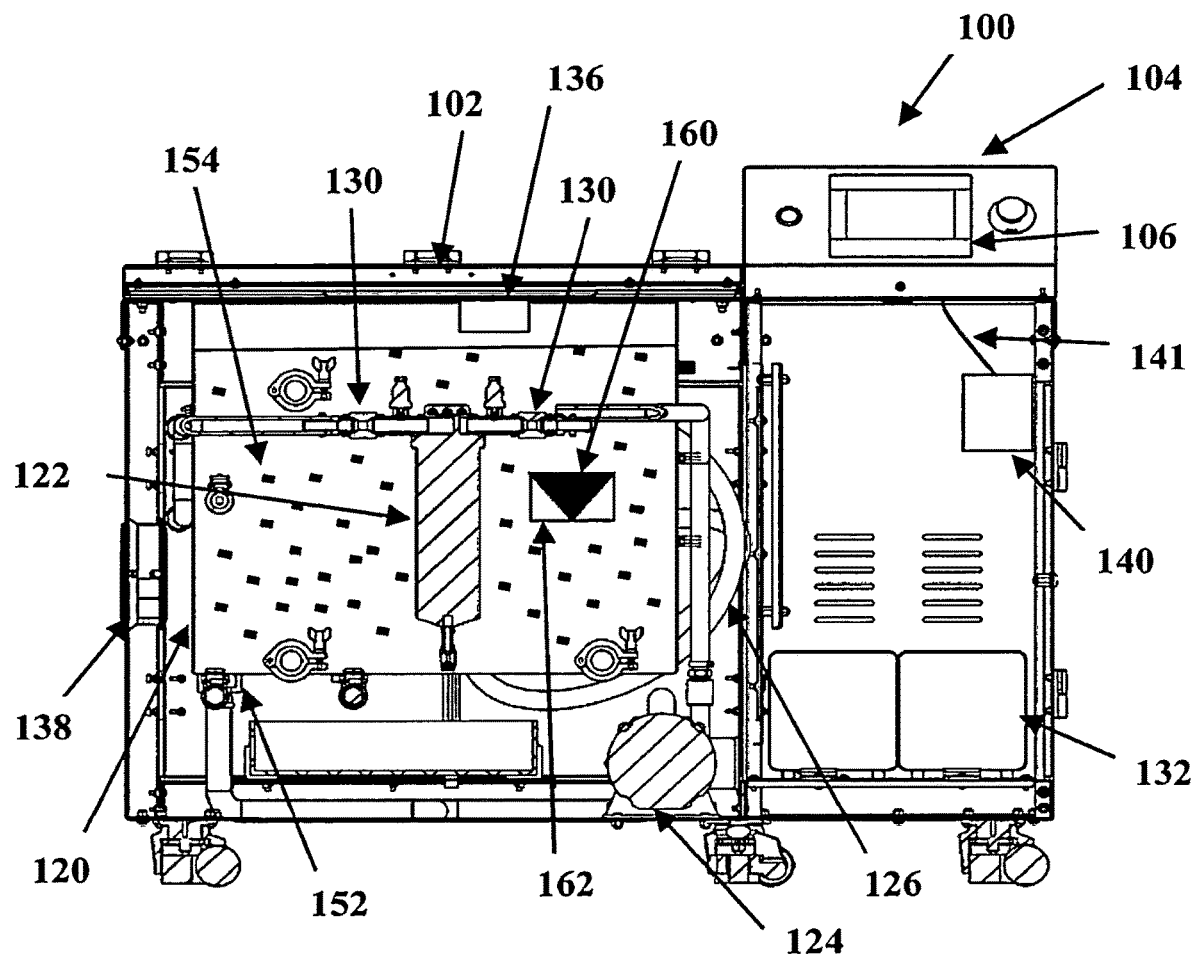
FIG. 3A is a cross-sectional view of the support material removal apparatus taken generally along line 3A-3A in FIG. 2.
Figure 3B:
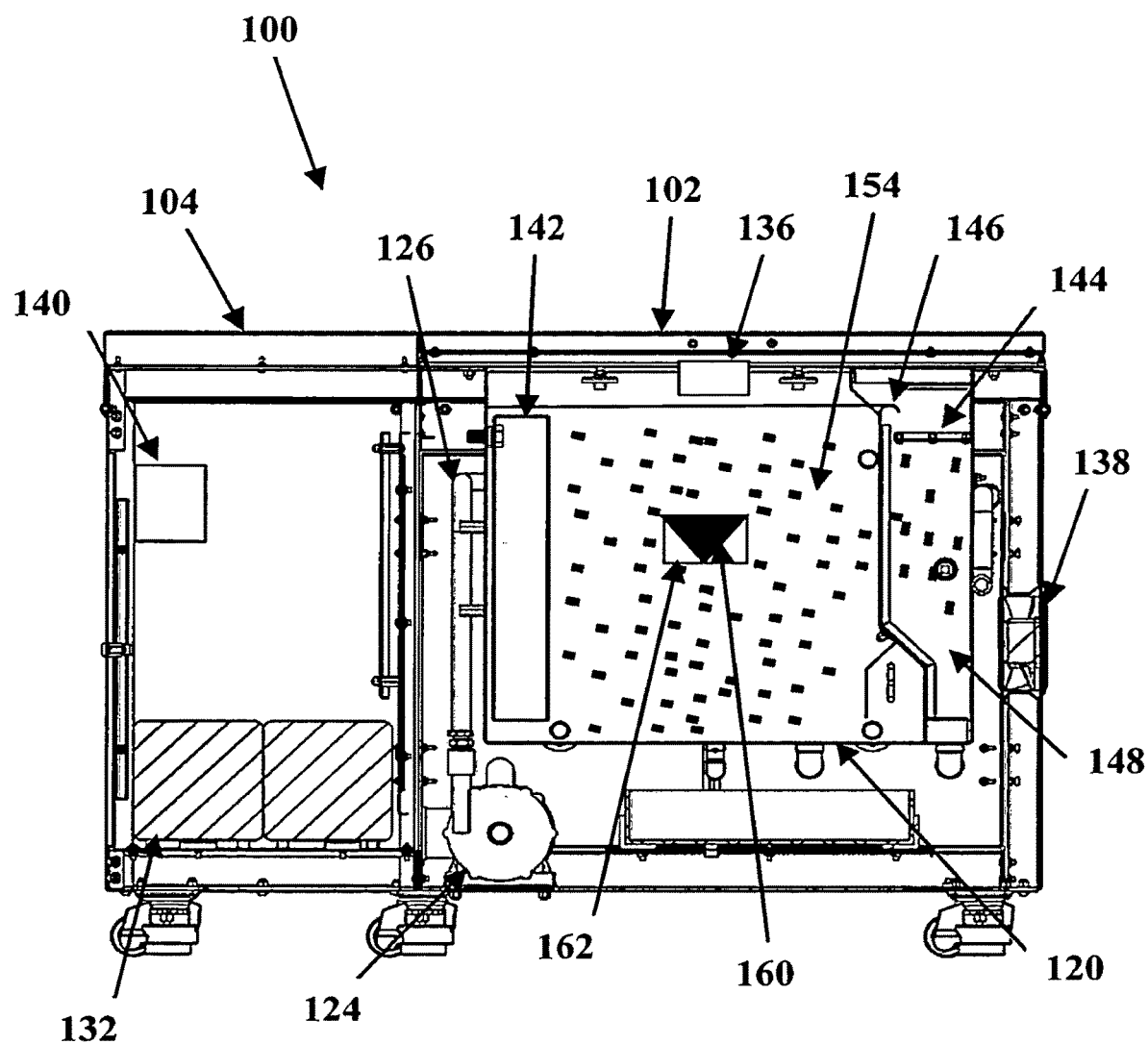
FIG. 3B is a cross-sectional view of the support material removal apparatus taken generally along line 3B-3B in FIG. 2.

FIGS. 3A and 3B show that chamber 120 may be arranged within chamber section 102, and that within chamber section 102 may be a filter 122, a pump 124, pressure sensors 130, part sensor 136, cooling unit 138, ultrasonic transducer 142 (shown in FIG. 3B), heating unit 150 (shown in FIG. 4), and temperature sensor 152. Media 154 may be operatively arranged within chamber 120. Media 154 can be a fluid or a plurality of abrasive bodies, or a combination thereof. Pump 124 may be connected to chamber 120 via pipes 126, which secure to chamber 120 at positions around the perimeter of chamber 120. Such an arrangement and with proper orientation of the pipes 126 relative to chamber 120 the media 154 may be caused to move to form a vortex within chamber 120. This vortex allows for an even and complete mixing of parts 160 which have support material 162 that must be removed. It is desirable to have parts 160 evenly and completely mixed with the media to ensure uniform removal of support material and/or surface finish. Part sensor 136 may be operatively arranged within chamber section 102 and may be capable of monitoring the effect media 154 has on put 160 including monitoring of support material 162. For example, part sensor 136 may be used to monitor the amount of support material 162 which has been removed over a specific time interval. Part sensor 136 may be an optical, infrared, thermal, or acoustic sensor, which can detect the rate of deterioration of part 160 and support material 162. Cooling unit 120 can be any suitable cooling device, and may include a fan. The cooling unit 120 and heating unit 150, can be used to cool or heat media 154 within chamber 120 during operation of apparatus 100. Pressure sensors 130 may be arranged within chamber 136 to detect the pressure of media 154 at the discharge of pump 124.

Arranged within control unit section 104 of apparatus 100 may be control input screen 106, control unit 140, and ultrasonic wave generators 132. Control input screen 106 may be communicatively connected to control unit 1.40 via wire 141. Control unit 140 may be communicatively connected to pump 124, pressure sensors 130, part sensor 136, cooling unit 138, heating unit 150, ultrasonic wave generators 132, and temperature sensor 152.

Figure 2:
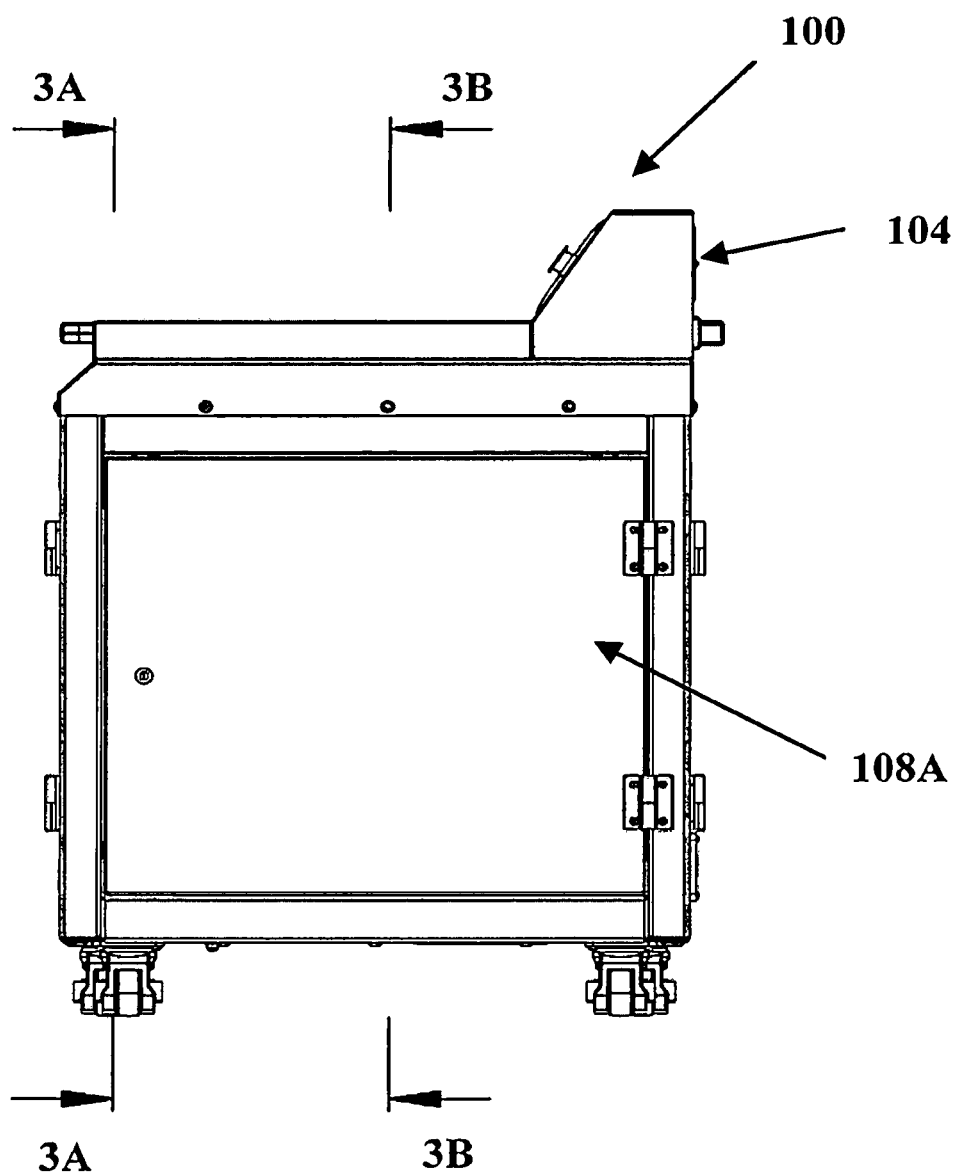
FIG. 2 is a side view of the support material removal apparatus depicted in FIG. 1.

FIG. 3B is a cross-sectional view of the support material removal apparatus 100 taken generally along line 3B-3B in FIG. 2. As shown in FIG. 3B, ultrasonic transducer 142 may be mounted and oriented relative to chamber 120 in order to agitate media 154. It should be appreciated that other types of agitators may be used in order to properly agitate media 154. Next to chamber 120 is overflow chamber 148 (shown in FIG. 3B). Overflow chamber 148 is arranged to allow media 154 to flow from chamber 120, but prevent part 160 from leaving chamber 120. From overflow chamber 148, the media flows to the suction side of pump 124 without. Media 154 flows over weir 146 into overflow chamber 148. As media 154 flows over weir 146, media passes through filtering screen 144, which filters out larger pieces of part 160 or support material 162 which may have broken off during the support removal process.

Figure 4:
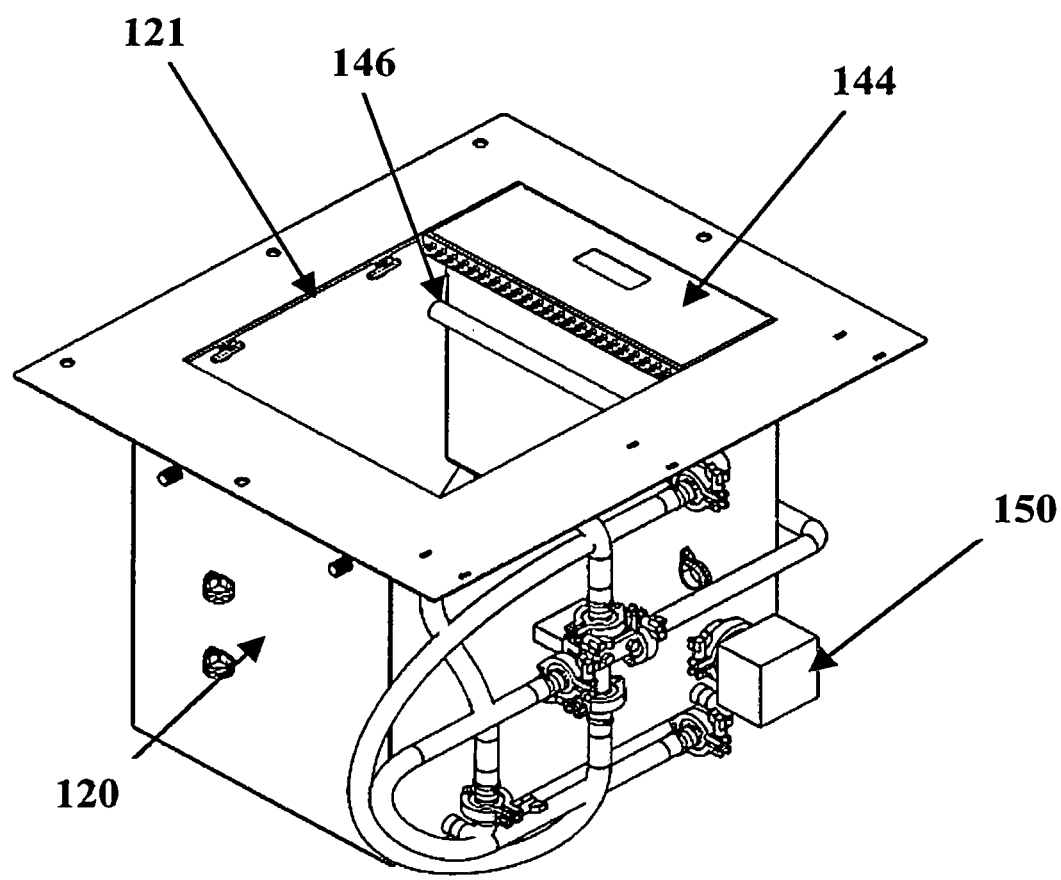
FIG. 4 is a perspective view of an internal chamber arranged within the support material removal apparatus depicted in FIG. 3A.

FIG. 4 is a perspective view of chamber 120. Heating unit 150 may be secured to chamber 120. Temperature sensor 152 may be arranged behind heating unit 150 and may be also secured to chamber 120. Chamber 120 includes opening 121 which allows an operator to place parts in chamber 120. Opening 121 can be accessed by lifting lid 110 (shown in FIG. 1) of chamber section 102.

Figure 5:
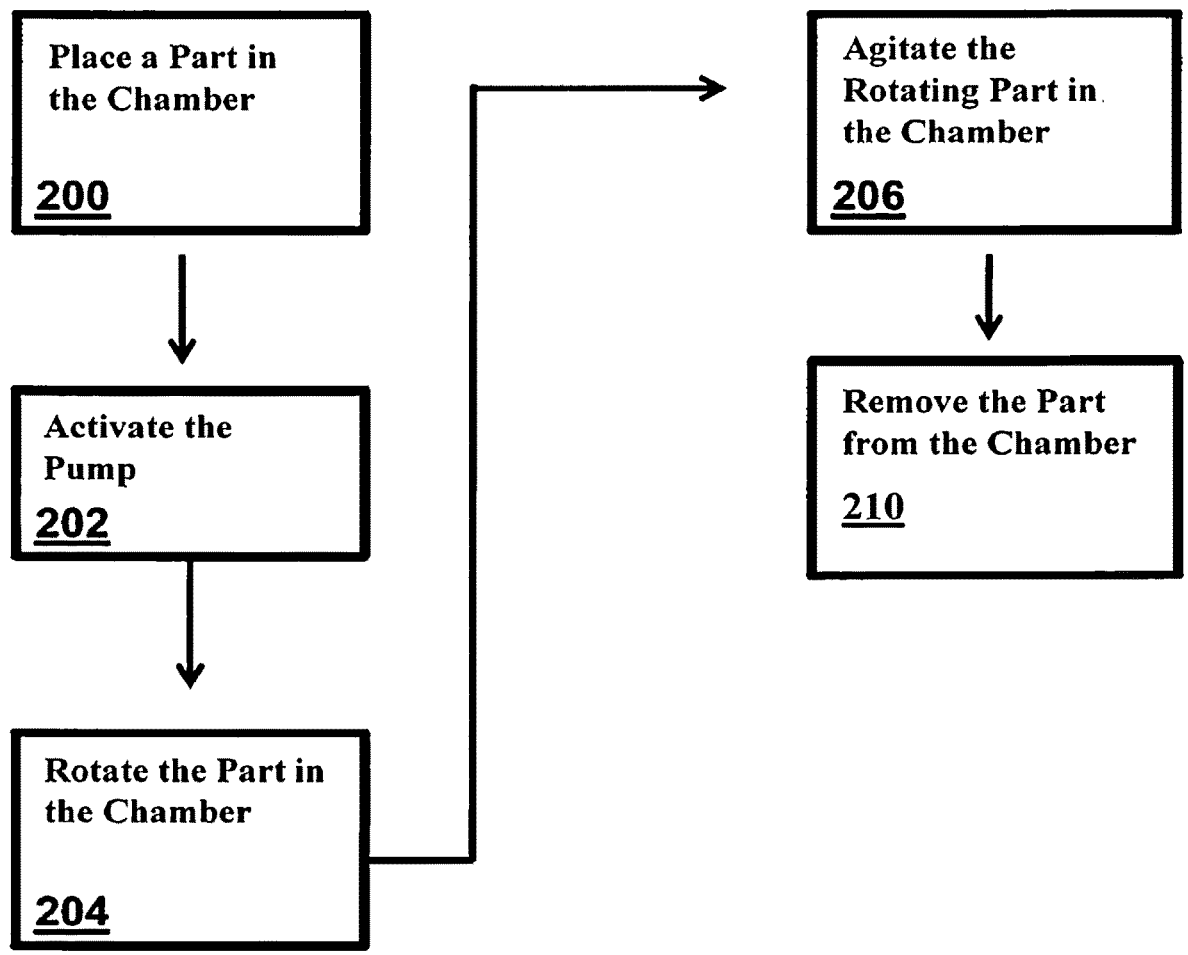
FIG. 5 is a flowchart illustrating an overview of the general operation of a support material removal method according to the present invention.

FIG. 5 is a flowchart that generally describes operation of a support material removal method. In such a method, a part 160 is placed 200 within chamber 120. Part 160 can be made using traditional manufacturing techniques, such as casting, forging, or injection molding, or can be made using additive manufacturing techniques such as 3D printing. Part 160 generally comprises unwanted material, which is referred to herein as support material 162, that is often a manufacturing by-product, such as flash from forging or burrs from machining of part 160. After part 160 is placed within chamber 120, the pump 124 may be activated 202 to begin the flow of media 154 around part 160. Due to the activation 202 of pump 124, part 160 rotates 204 in chamber 120. The vortex which may be formed in media 154 as a result of activating 202) the pump 124 rotates part 160 within the media 154 to achieve surface coverage of part 160. As part 160 rotates in chamber 124, ultrasonic transducer 142 may be activated 266. Activation 206 of ultrasonic transducer 142 agitates the media 154 that surrounds part 160 in order to increase the removal rate of support material 162 from part 160. While agitation of media 154 occurs, part 160 continues to rotate within chamber 120 to ensure complete part coverage of the part 160 by the media 154. After the process removes unwanted support material 162, the finished part 160 is removed 210 from chamber 120.

Figure 6:
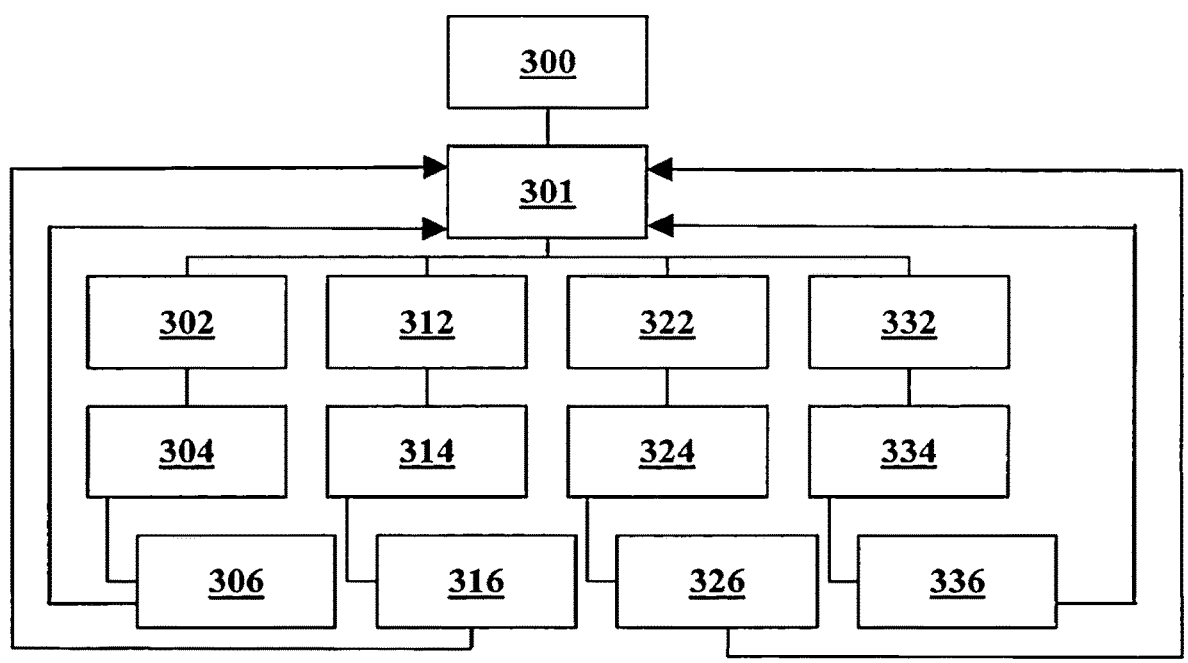
FIG. 6 is a flowchart describing optimization of the support material removal method according to a first embodiment of the present invention; and, FIG. 7 is a flowchart describing optimization of the support material removal method according to a second embodiment of the present invention.

FIG. 6 is a flowchart showing an embodiment of a method of renewing support material from an unfinished manufactured part. A user places a part in the chamber 120 filled with media 154. At step 300, a user choosing certain parameters of the whole process, such as the run time, temperature, and intensity level. Intensity level is a factor which correlates to how aggressively support material 162 is removed from part 160. By selecting the intensity level, corresponding preselected settings are automatically selected for removal methods such as ultrasonic agitation level and/or pump pressure, and/or temperature of media 154. Using the inputted parameters from step 300, control unit 140 will then provide these parameters to algorithm step 301. At step 301, an algorithm determines how fast the removal methods will increase to reach the selected parameters. Since ultrasonic agitation, pump pressure, media and temperature all have an effect on the part 160, the interaction of each parameter with one another may be balanced in order to make the most predictable process by knowing the extent at which each parameter can influence the others when varying that parameter. Using the settings of step 300, the algorithm step 301 determines the starting points for each removal method, such as for agitation level, pump pressure, temperature, and the time that each removal method will be carried out at a particular setting. Each parameter will be monitored individually and in parallel with one another over defined time intervals. For example, step 302 includes setting the temperature to the intensity level determined by algorithm step 301. Step 304 includes running the process at the set temperature from step 302 over a defined first time interval. And, at step 306 the temperature is checked.

Similarly, step 312 includes setting ultrasonic agitation to the level from algorithm step 301. Step 314 includes running the process at the set agitation level from step 312 over the defined first time interval. And, at step 316 the agitation level is checked.

Step 322 includes setting the pump pressure to the level from algorithm step 301. Step 324 includes running the process at the set pump pressure from step 312 over the defined first time interval. And, at step 326 the pump discharge pressure is checked.

Additionally, step 332 includes setting the media pH to the level from algorithm step 301. Step 334 includes running the process at the set media pH level from step 332 over a defined first time interval. And, at step 336 the pH of the media is checked.

Once checked 306, 316, 326, 336, the values of temperature, agitation level, pump discharge pressure, and pH of the media can be fed back to algorithm step 301, where a second set of parameters for temperature, agitation level, pump pressure, and oil may be determined. Using the second set of parameters, the process is then run again over a defined second time interval. It should be appreciated that the second time interval may be shorter than the first time interval. The process can run through a plurality of time intervals prior to finishing the process. As such, the process is iterative, which works to optimize the support removal process within a specified time duration. This process overall keeps the parameters close to a desired level at each iteration of the process. In a preferred embodiment, algorithm step 301 utilizes a parameter database which has been formulated from a plurality of process runs on other parts using the same apparatus and method. Analysis of these parameters may allow for optimization of the process with respect to a particular part process.

Figure 7:
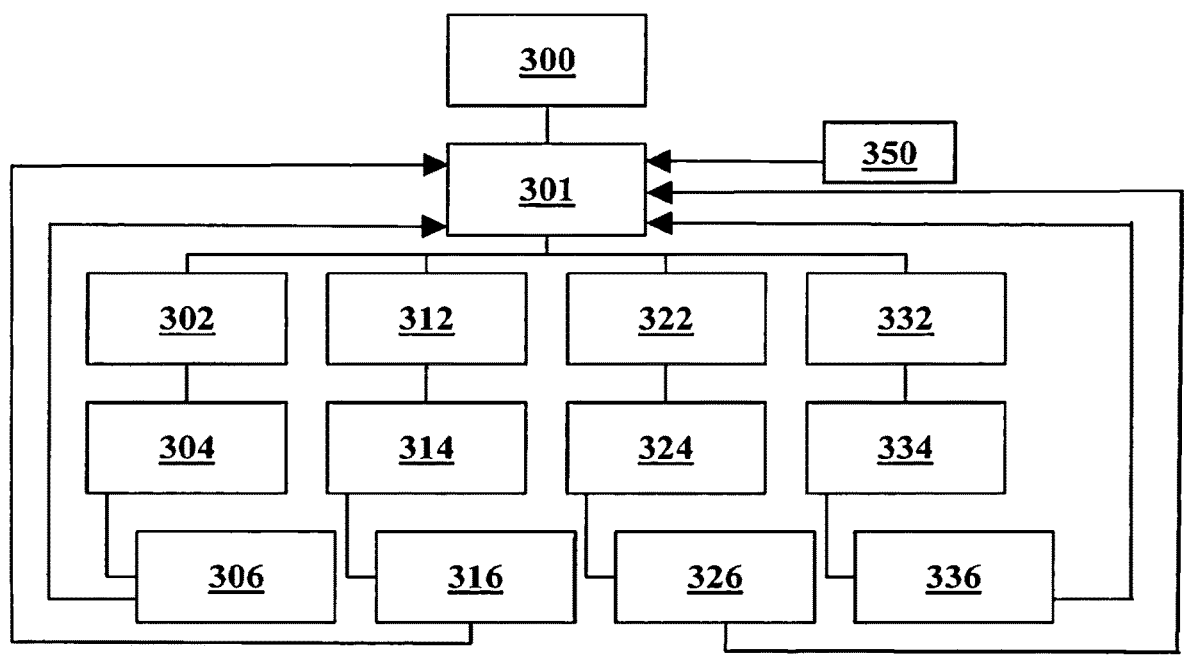

FIG. 7 is a flowchart showing another embodiment of a support material removal method. This second embodiment of the support material removal process is similar to the first embodiment of the process shown in FIG. 6, except that additional step 350 is included. Step 350 is the scanning of the part within the machine while the support material is being removed. Such scanning may be used to determine (a) the amount of support material removed from the part, (b) the amount of support material remaining on the part, or (c) both (a) and (b). This information, or measurement, may be sent to algorithm step 301 as data which is used to determine parameter levels for the process. By evaluating the measurement from step 350, the process will be able to adapt depending on how effective the process has been during one or more prior time intervals. Additionally, it should also be appreciated that step 350 can be a real-time measurement of the support material on the part, or an evaluation of a computer aided design (CAD) model of the part. The information obtained by scanning 350 the part may be used by the algorithm at step 301 to more efficiently make a determination of the parameters selected for the process.

In the foregoing description, example embodiments are described. The specification and drawings are accordingly to be regarded in an illustrative rather than a restrictive sense.

It will be appreciated that various aspects of the above-disclosed invention and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE NUMERALS 100 support material removal apparatus
102 chamber section
104 control unit section
106 control input screen
108A access door
108B access door
108C access door
110 lid
120 chamber
121 opening
122 filter
124 pump
126 pipes
130 pressure sensor
136 sensor
138 cooling unit
142 ultrasonic transducer
144 filtering screen
146 weir
148 overflow chamber
150 heating unit
152 temperature sensor
154 media
160 part
162 support material
200 placement step
202 activation step
204 rotation step
206 agitation step
210 removal step
300 initial parameter entry step
301 algorithm step
302 setting temperature step
304 running process step
306 temperature check step
312 setting agitation level step
314 running process step
316 agitation level check step
322 setting pump pressure step
324 running process step
326 pump pressure check step
332 setting pH/liquid level step
334 running process step
336 pH liquid level check step
350 scanning step

What is claimed is:

1. A method of removing support material from a part, comprising:
   determining a first set of parameters of a media arranged within a chamber;
   subjecting a part with support material to said media having said first set of parameters over a first time interval;
   measuring an effect said media has on said support material over said first time interval via a sensor operatively arranged to view said part during said process;
   comparing said effect said media has on said part over said first time interval to a computer-generated model of said part;
   determining an amount of said support material which remains attached to said part;
   determining a second set of parameters of said media prior to the end of said first time interval;
   subjecting said part with support material to said media having said second set of parameters over a second time interval, said second time interval being shorter than said first time interval;

repeating said method over a plurality of consecutive time intervals until a run time for said method has been reached; and, removing said part from said media after said run time for said method has been reached.

2. A method of removing support material from a part, comprising:

determining a first set of parameters of a media arranged within a chamber;

subjecting a part with support material to said media having said first set of parameters over a first time interval; wherein an effect said media has on said part over said first time interval is compared to a computer-generated model of said part to determine an amount of support material which remains attached to said part;

determining a second set of parameters of said media prior to the end of said first time interval;

subjecting said part with support material to said media having said second set of parameters over a second time interval, said second time interval being shorter than said first time interval;

repeating said method over a plurality of consecutive time intervals until a run time for said method has been reached; and, removing said part from said media after said run time for said method has been reached.

3. The method of support material removal as recited in claim 2, further comprising:

receiving a data set from said user in order to set said set of first parameters of said media;

measuring the temperature, agitation level, or pump pressure of said media via a sensor operatively arranged to read in data from said media; and determining the second set of parameters of said media by using said measurements of said media.

4. The method of support material removal as recited in claim 2, wherein said media is a fluid, a plurality of abrasive bodies, or a combination of both.

5. The method of support material removal as recited in claim 2, wherein said set of first parameters is determined from a parameter history database.

6. The method of support material removal as recited in claim 2, further comprising measuring an effect said media having said second parameters imparts on said support material over said second time interval via a first sensor.

7. An apparatus for removal of support material from a 3D printed part, comprising:

a chamber for containing a fluid media;

an agitator operative to agitate the fluid media;

a part sensor operative to monitor an effect said fluid media has on the 3D printed part over a time interval; and a control unit configured to be responsive to an output of the part sensor and based on an amount of support material remaining on the 3D printed part determined from said output and a computer-generated model of the 3D printed part operative to determine a change in an operating parameter, and further said control unit configured to apply said change in the operating parameter to operation of the apparatus.

8. The apparatus of claim 7 further comprising:

a heating unit operative to heat the fluid media.

9. The apparatus of claim 7 further comprising:

a transducer operative to apply ultrasonic waves to the fluid media.

10. The apparatus of claim 7 further comprising:

a pump operative to circulate the fluid media in the chamber.

11. The apparatus of claim 7 wherein said change in the operating parameter includes at least one of temperature or agitation.

12. The apparatus of claim 7 wherein said part sensor detects at least one of: an amount of support material remaining on the 3D printed part, or an amount of support material removed from the 3D printed part.

13. The apparatus of claim 7 wherein said part sensor is an optical, infrared, thermal, or acoustic sensor.

14. The apparatus of claim 7 wherein the part sensor is operatively arranged to view said 3D printed part within said chamber and take a measurement of an amount of said support material removed from said 3D printed part.

15. The apparatus of claim 7 further comprising:

a pressure sensor operative to measure pressure of said fluid media and provide an output to said control unit.

16. The apparatus of claim 7 further comprising:

a temperature sensor operative to measure temperature of said fluid media and provide an output to said control unit.

17. The apparatus of claim 7 further comprising:

a pH sensor operative to measure a pH of said fluid media and provide an output to said control unit.

18. The apparatus of claim 7 further comprising:

a parameter database which had been formulated from a plurality of process runs on other 3D printed parts, wherein said control unit is configured to obtain data from and provide data to said parameter database.

19. The apparatus of claim 7, wherein said support material is created due to an additive manufacturing process that produced the 3D printed part.

* * * * *